United States Patent [19]
Arimoto

[11] Patent Number: 5,053,619
[45] Date of Patent: Oct. 1, 1991

[54] VARIABLE DENSITY SCANNING APPARATUS

[75] Inventor: Akira Arimoto, Kodaira, Japan

[73] Assignees: Hitachi, Ltd.; Hitachi Kiki Co., Ltd., Tokyo, Japan

[21] Appl. No.: 501,879

[22] Filed: Mar. 30, 1990

Related U.S. Application Data

[63] Continuation-in-part of Ser. No. 390,400, Aug. 7, 1989, Pat. No. 5,006,705.

[30] Foreign Application Priority Data

Apr. 3, 1989 [JP] Japan .................. 1-081392

[51] Int. Cl.⁵ .............................................. H01J 3/14
[52] U.S. Cl. .................................... 250/235; 346/108; 358/494
[58] Field of Search ............... 250/235, 236; 346/108, 346/160; 350/3.71, 6.6, 6.7; 358/494–495, 496, 497

[56] References Cited

U.S. PATENT DOCUMENTS

| | | | |
|---|---|---|---|
| Re. 31,334 | 8/1983 | Spaulding et al. | 346/108 |
| 4,000,493 | 12/1976 | Spaulding et al. | 346/108 |
| 4,425,023 | 1/1984 | Matsumoto et al. | 350/96.13 |
| 4,502,081 | 2/1985 | Otsuka et al. | 358/494 |
| 4,600,266 | 7/1986 | Omi | 350/3.71 |
| 4,650,997 | 3/1987 | Yawn et al. | 350/6.7 |
| 4,651,170 | 3/1987 | Chandler et al. | 346/108 |
| 4,768,043 | 8/1988 | Saito et al. | 346/108 |
| 4,920,364 | 4/1990 | Andrews et al. | 346/160 |
| 4,969,699 | 11/1990 | Noguchi et al. | 350/6.6 |

FOREIGN PATENT DOCUMENTS

55-119785 9/1980 Japan .

*Primary Examiner*—David C. Nelms
*Assistant Examiner*—Stephone Allen
*Attorney, Agent, or Firm*—Fay, Sharpe, Beall, Fagan, Minnich & McKee

[57] ABSTRACT

A variable density scanning apparatus comprises a semiconductor laser which generates at least one laser beam, a first drive circuit which applies to said semiconductor laser a modulation drive signal having a predetermined modulation frequency in accordance with the density of dots constituting the pattern to be formed on the scanning surface, a dynamic diffraction grating which receives a laser beam from said semiconductor laser and diffracts said laser beam into a plurality of diffraction beams, a second drive circuit which applies to said dynamic diffraction grating a diffraction drive signal having a predetermined high frequency in accordance with the dot density, a polygonal mirror which receives a plurality of diffraction beams from said dynamic diffraction grating and scans said diffraction beam in the main scanning direction, a third drive circuit which applies to said polygonal mirror a rotation drive signal having a predetermined rotation frequency in accordance with the dot density, and a control unit which applies to said first, second and third drive circuits respectively a control signal that indicates an instruction to change the dot density.

17 Claims, 11 Drawing Sheets

- 4+ PRIMARY BEAM
- 4o O-TH BEAM
- 4- PRIMARY BEAM

- 4+ PRIMARY BEAM
- 4o O-TH BEAM
- 4- PRIMARY BEAM

FIG. 5B

CROSS SECTION INTENSITY

VARIABLE DENSITY SCANNING APPARATUS

CROSS REFERENCE TO RELATED APPLICATION

This application is a continuation-in-part of our co-pending application Ser. No. 07/390,400, now U.S. Pat. No. 5,006,705, filed on Aug. 7, 1989.

BACKGROUND OF THE INVENTION

The present invention relates to a scanning apparatus which utilizes a laser, and, more particularly to a variable density scanning apparatus which is capable of changing printing density for use in a laser printer unit.

A conventional scanning apparatus which utilizes a laser beam has a polygonal mirror and a photo-sensitive drum of which rotation speeds are constant so that scanning density for printing is always constant. There has recently been an increasing demand that a graph is to be printed on a paper of different sizes by changing only dimensions of the graph. For this purpose, there have been various proposals according to which the rotation speed of a polygonal is changed and the modulation frequency of a laser is changed in the state that the rotation speed of a photo-sensitive drum is kept constant in order to change the density of printing dots (see JP-A-55-119785, for example). By such an arrangement as described, it is certainly possible to change the intervals (density) of printing dots both in the main scanning direction and the sub scanning directions. However, the spot size of a laser for printing one picture element remains still unchanged in this method. The spot size can be substantially changed in the main scanning direction because the modulation frequency of a laser is changed, but the spot size of a laser in the sub scanning direction does not change at all.

Figure 2A:
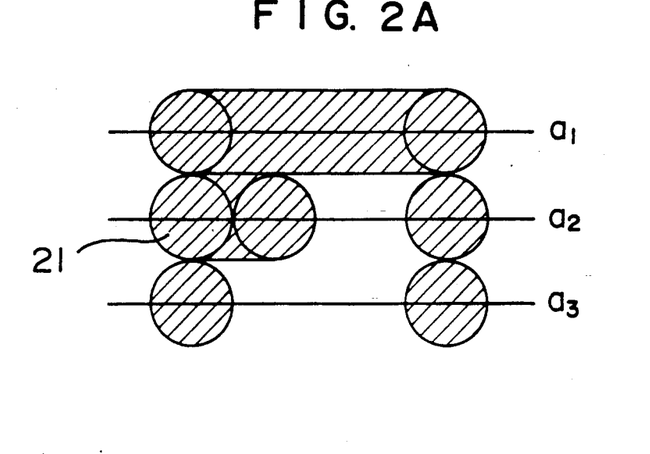
FIGS. 2a, 2b and 2c show problems which are generated when a scanning density is changed without applying the present invention.
Figure 2B:
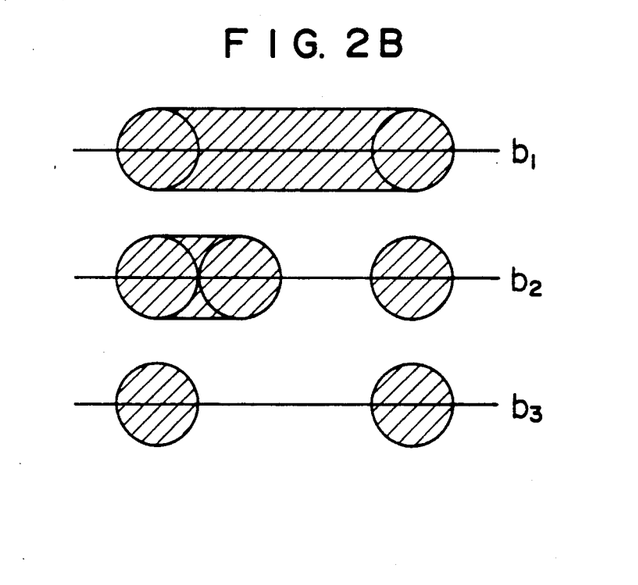
Figure 2C:
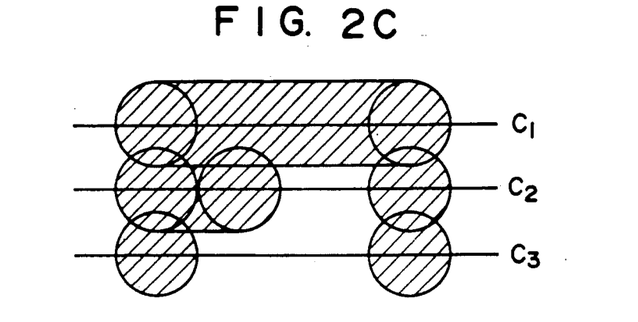

FIGS. 2A and 2B show inconveniences which occur when a spot diameter is not changed even if scanning density is changed. FIG. 2A shows a state when the spot size is optimum under a certain interval of scanning density, and FIGS. 2B and 2C show states when the interval is changed from that of FIG. 2A. A state when the spacing is expanded and a state when the spacing is reduced are shown in FIG. 2B and FIG. 2C, respectively. FIG. 2B shows that a gap occurs, and FIG. 2C shows that unnecessary portions are also blacked out. Picture quality is changed and lowered in these cases. Therefore, when scanning interval (density) is changed, it is necessary that the spot size of a beam to be stopped is also changed occasionally to keep an optimum diameter.

SUMMARY OF THE INVENTION

It is an object of the present invention to provide a new variable density scanning apparatus which prevents reduction of picture quality attributable to change of scanning interval which occurs in the prior art as described above.

The present invention is characterized in that the focussing spot diameter in the sub scanning direction is changed to achieve the above object.

For this purpose, a dynamic diffraction grating which works in the sub scanning direction is provided in the light path, and its ±first order grating beam and 0-th beam are used to enable the spot diameter to be substantially changed in one dimensional direction by effectively utilizing the light quantity without major loss.

Figure 3A:
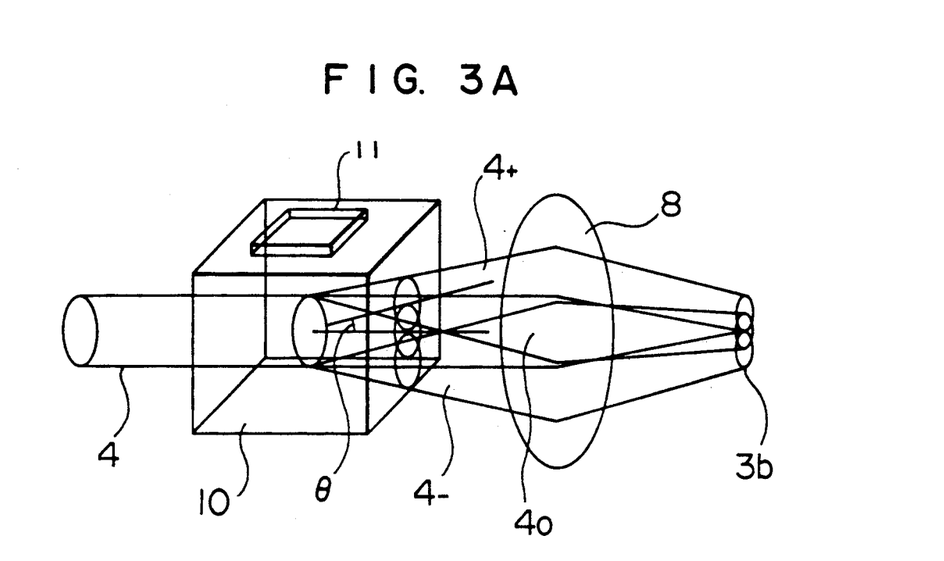
FIGS. 3A and 3B show operation principles of the dynamic diffraction grating according to the present invention.

FIG. 3A shows the principle of the present invention. 10 designates a dynamic diffraction grating made of an optical crystal of large coefficient of elasticity, such as, for example, $TeO_2$ and $PbMoO_4$. A high-frequency signal is applied to a transducer 11 which is provided at one terminal of a crystal, to generate an ultrasonic wave. When the ultrasonic wave travels within the optical crystal, a progressive wave type (dynamic) diffraction grating is generated. When a flux of light is incident in such a diffraction grating, first order diffraction beams 4+ and 4− are generated in the following direction with respect to the 0-th beam $4_o$:

$$Q = \pm \frac{\lambda}{D}$$

where D is an interval of the diffraction grating formed within the crystal and Co is equal to $\nu\lambda$ (where $\nu$ is a high frequency signal to be applied and Co is a speed of an ultrasonic wave within the crystal). Accordingly, the ± first order beams 4+ and 4− are generated to superpose on both ends of the 0-th beam $4_o$, and it becomes possible to change the shape of the focused laser beam in the sub scanning direction through a lens 8, as shown by a spot 3b. It is possible to change the diameter of the spot 3b in the sub scanning direction by changing over the frequency of the ultrasonic wave to be applied to the optical crystal (that is, the frequency of a high frequency signal fv to be applied to the transducer 11) in accordance with the scanning density.

Particularly in the present invention, intensities of the ± first order beams 4+ and 4− are set equal in the following procedure.

Figure 3B:
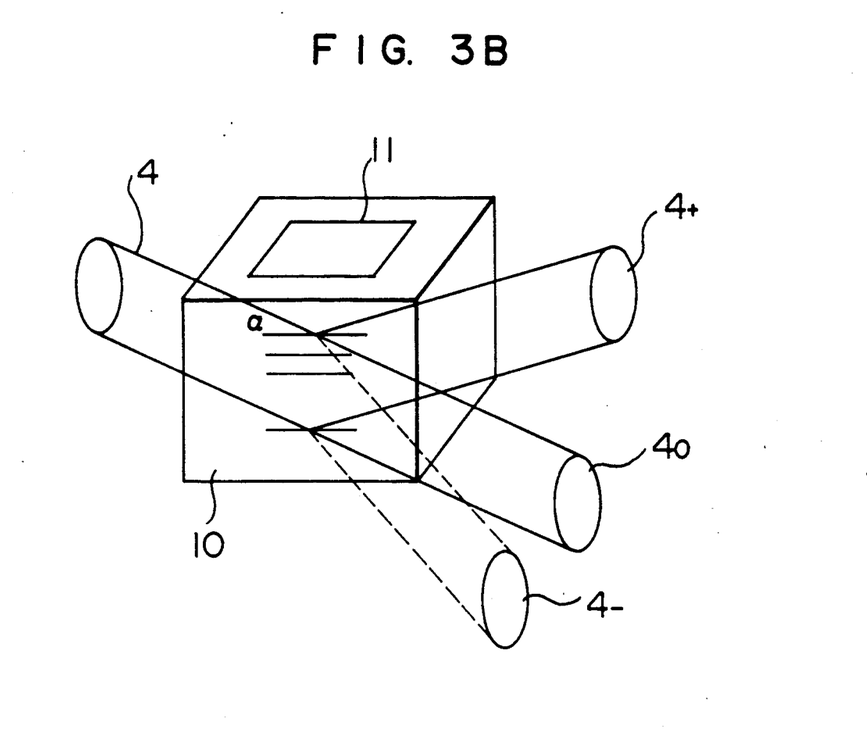
Figure 4A:
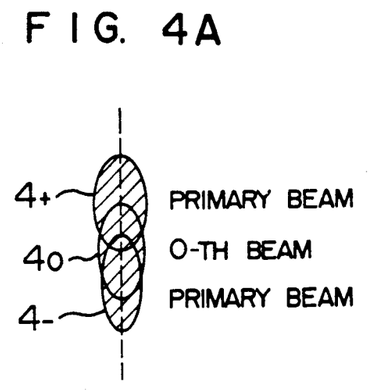
FIGS. 4A and 4B explain the problems which are generated when the dynamic diffraction grating is used as shown in FIG. 3B.
Figure 4B:
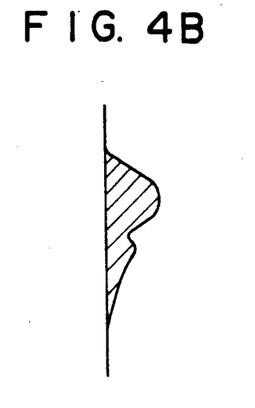
Figure 5A:
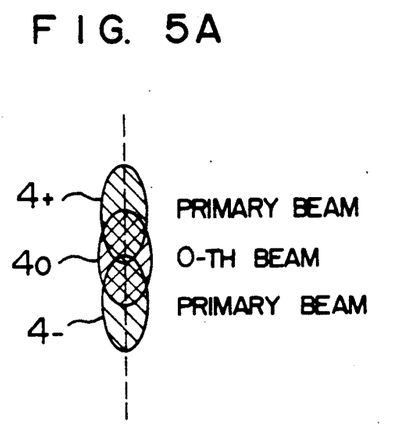
FIGS. 5A and 5B show the spot shape and the intensity of its cross section when the dynamic diffraction grating of the present invention shown in FIG. 3A is used.
Figure 5B:
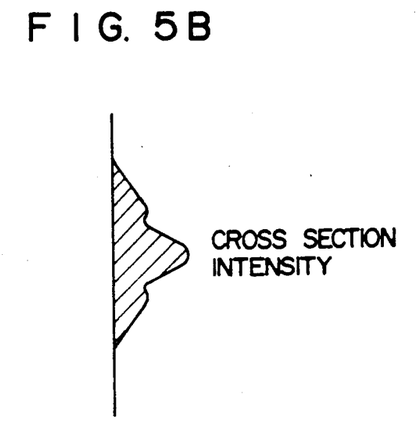

In general, when an incident flux of light 4 is applied to a diffraction grating at an angle $\alpha$ to meet the condition of $2D \sin \alpha = \lambda$ (which meets the Bragg condition) in a dynamic diffraction grating by using ultrasonic waves as shown in FIG. 3B, only the first order beam 4+ is intensified and 70% to 80% of the incident beam is guided as a + first order beam. 20% to 30% of the incident beam remains as a 0-th beam $4_o$, and little −(minus) first order beam 4− is generated. This way of using the beams is sufficient because normally only the + first order beam 4+ is used and the others are cut. However, under this condition of using the beams, light quantity is lost. When a spot shape is to be changed by using the 0-th beam $4_o$ and the − first order beam 4− as well, a light spot obtained has a shape as shown in FIG. 4A and the intensity distribution of the cross-hatched cross section becomes non-symmetrical as shown in FIG. 4B. According to the present invention, it is necessary to set the intensity distribution of the spot to be vertically symmetrical with respect to the center of the spot. When the flux of light 4 is applied, at an incident angle of $\alpha = 0$, to the dynamic diffraction grating which is formed within the optical crystal, as shown in FIG. 3A, this does not meet the Bragg condition. Therefore, about 10% to 20% of beam is equally generated as the ± first order diffraction beams 4+ and 4− respectively, and about 50% of beam remains as the 0-th beam $4_o$ When this is focused with a lens 8, a light spot 36 which is vertically symmetrical is obtained as shown in FIG. 5A. The light intensity distribution of the cross-hatched cross section of the spot becomes symmetrical as shown in FIG. 5B.

Figure 6:
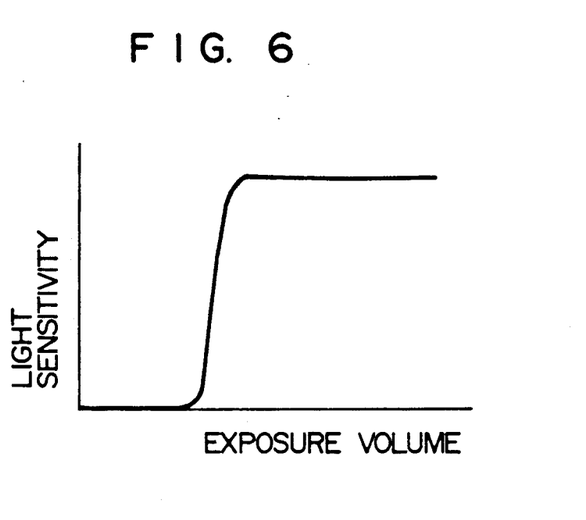
FIG. 6 shows one example of exposure characteristics of the photo-sensitive drum which is used in the present invention.
Figure 7A:
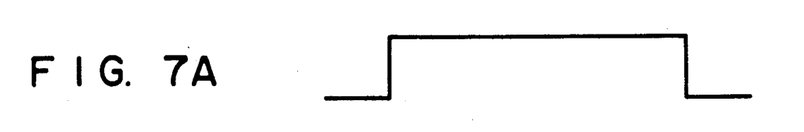
FIGS. 7A and 7B show that a uniform pattern (latent image) can be formed on the photo-sensitive drum when a suitable photo-sensitive threshold value is used.
Figure 7B:
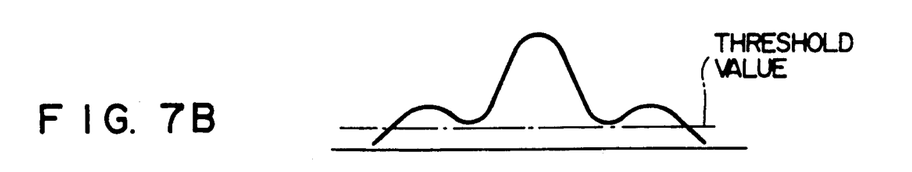

Two-value exposure characteristics are used as photo-sensitive characteristics of a photo-sensitive drum that is used for a laser printer, as shown in FIG. 6. In this case, even when a light spot having an intensity distribution shown in FIG. 7A which corresponds to FIG. 5B is used, a uniform exposure pattern (a latent image) as shown in FIG. 7B is obtained, if the photo-sensitive threshold value of the photo-sensitive drum is set at a position shown by a dotted chain line. Accordingly, when the interval D of the dynamic diffraction grating is changed by changing the frequency $v$ of an ultrasonic wave with the transducer 11 as described above, it is possible to change the diameter of the spot 36 in one dimension. Further, when a suitable threshold value is used, a uniform pattern (latent image) can be formed on the photo-sensitive drum.

Advantages of using the dynamic diffraction gratings will be described below. According to the present invention, it is possible to continuously change the spot diameter in one dimension by changing the frequency. Therefore, a uniform pattern (latent image) of a desired diameter can be formed on the photo-sensitive drum by suitably setting a photo-sensitive threshold value of the photo-sensitive drum. Further, an incident laser beam can be utilized efficiently because all the 0-th and ± first order beams are used. The inventors of the present invention have previously proposed a variable density printer according to a change of a spot diameter which uses an electrooptical effect in U.S. Pat. No. 4,768,043. In this proposal, a spot diameter is changed by using a polarization characteristic of a beam. There is a problem that a light quantity varies depending on the size of a spot diameter to be obtained and that not all the light quantity can be used. However, according to the present invention, it is possible to effectively utilize all the light of the incident laser beams as described above, and further, there is a large advantage that the light quantity will not change regardless of the spot diameter to be obtained.

DESCRIPTION OF THE PREFERRED EMBODIMENTS

Figure 1:
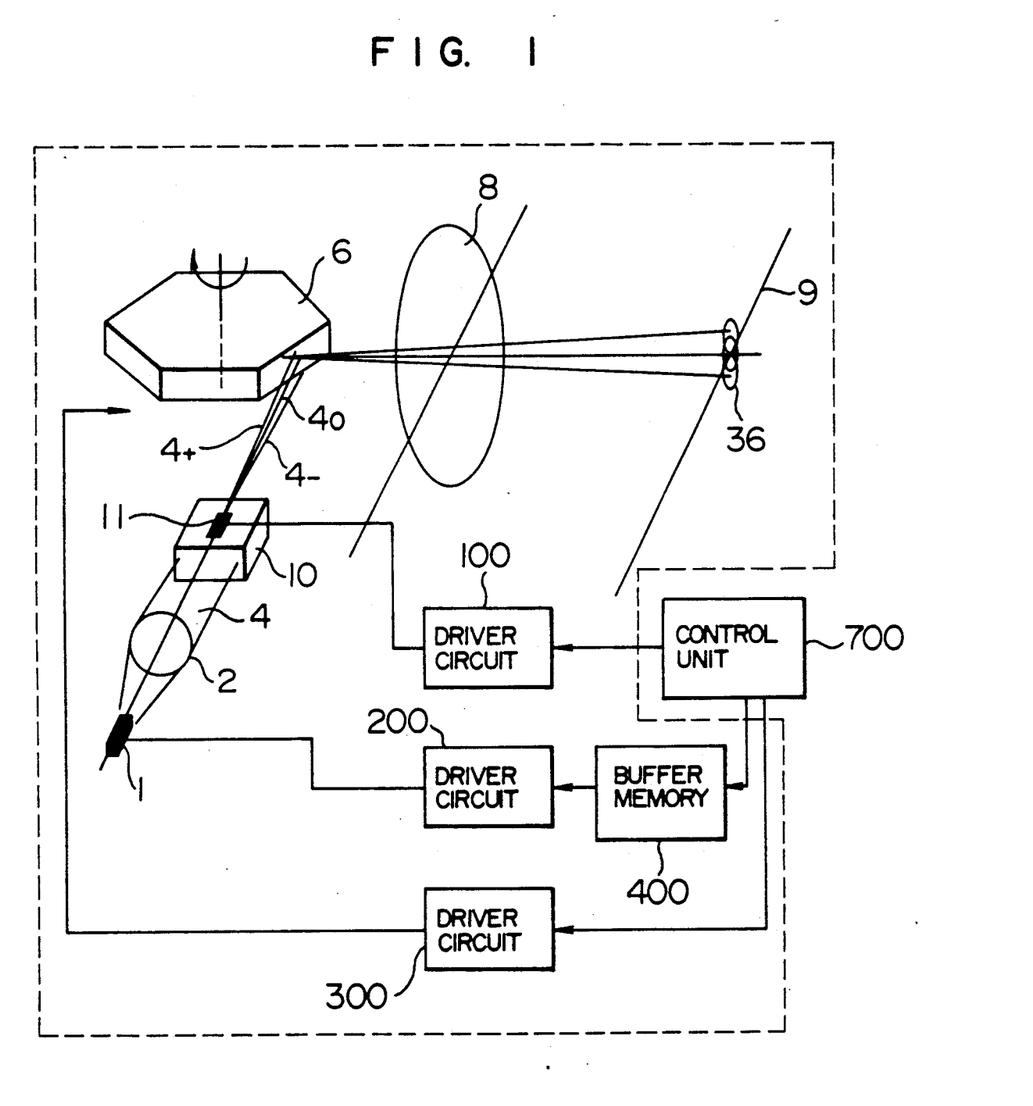
FIG. 1 shows a configuration of a first embodiment of the present invention.

FIG. 1 shows one embodiment of the variable density scanning apparatus relating to the present invention. 1 designates a semiconductor laser and 2 designates a collimator lens. A laser beam 4 sent from the semiconductor laser 1 passes through the collimator lens 2 and becomes a collimated light beam. When a dynamic diffraction grating 10 is positioned between a polygonal mirror 6 and the collimator lens 2, ± first order diffraction beams 4+ and 4− are generated in the sub scanning direction in accordance with a high frequency signal to be applied to this dynamic diffraction grating 10, as described above. When the high frequency signal is not applied, the light beam 4 passes straight. The ± first order beams 4+ and 4− and 0-th beam $4_o$ are scanned together by the polygonal mirror 6 and are applied to the scanning lens 8, so that a laser spot 36 of a desired diameter can be obtained in the sub scanning direction on the photo-sensitive drum which is a scanning surface 9.

Assume that the portion encircled by a dotted line in FIG. 1 is operated as a printer, as an example. Then, commands such as dot density and printing contents are transmitted to the printer in accordance with the contents of printing.

100 designates a driver circuit for the dynamic diffraction grating 10, and the driver circuit sets the frequency of a high frequency signal to be applied to a transducer 11 at a predetermined value in accordance with a command relating to the dot density from a control unit 700. This command signal is sent also to a driver circuit 300 which drives the polygonal mirror 6. The driver circuit 300 controls the rotation of the polygonal mirror 6 in such a way that the rotation number of the polygonal mirror 6 is increased proportionately when the dot density increases and the rotation number is decreased proportionately when the dot density decreases. When the driven circuit 300 which drives the polygonal mirror 6 is, for example, a hysteresis synchronous motor, the rotation number is controlled through the frequency control of a crystal oscillator stored in the motor. Accordingly, in order to change the dot density, crystal oscillators of which frequencies are different are prepared by that number.

The command of the printing contents sent from the control unit 700 is transmitted to the driver circuit 200 of the laser 1 through a buffer memory 400. The contents of the buffer memory 400 are read out at a high modulation frequency when the dot density is high and at a low modulation frequency when the dot density is low, to modulate the laser 1, and the printing contents are recorded on the photo-sensitive drum 9.

Figure 8A:
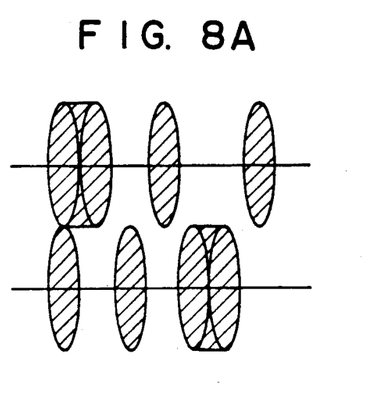
FIGS. 8A and 8B show one example a compressed pattern and an expanded pattern respectively.
Figure 8B:
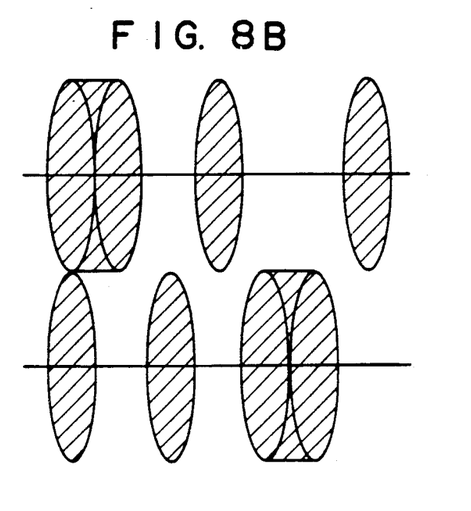

Assume the same pattern is printed by expanding the pattern such as, for example, from FIG. 8A to FIG. 8B. Description will be made with reference to FIG. 9. Assume, for example, that when a one-bit signal is applied from the control unit 700, a compressed pattern is printed as shown in FIG. 8A and when a two-bit signal is applied from the control unit 700, an expanded pattern is printed as shown in FIG. 8B. In this case, a signal fV to be applied to the dynamic diffraction grating 10 is in a low frequency $fV_2$ at the time of the compressed pattern shown in FIG. 8A and in a high frequency $fV_1$ at the time of the expanded pattern shown in FIG. 8B. This is because the interval D of the dynamic diffraction grating is set at a smaller value in the case of FIG. 8B in order to have a larger spot diameter in the sub scanning direction. The frequency fV can not be decided at a constant value and should be decided experimentally. The signal fD of the driver 200 is transmitted at a high-speed modulation frequency $fD_2$ when a compressed pattern of FIG. 8A is to be obtained and is transmitted at a frequency $fD_1$ which is lower by the ratio of the printing density when an expanded pattern of FIG. 8B is to be obtained. From the driver circuit 300 of the polygonal mirror 6, a frequency fM of the crystal oscillator to operate the synchronous motor is applied to the motor. Thus, the rotation number of the polygonal mirror 6 is controlled by using a high-frequency signal $fM_2$ when a compressed pattern of FIG. 8A is to be obtained and by using a frequency signal $fM_1$ which is lower by the dot density ratio when an expanded pattern of FIG. 8B is to be obtained.

Figure 9A:
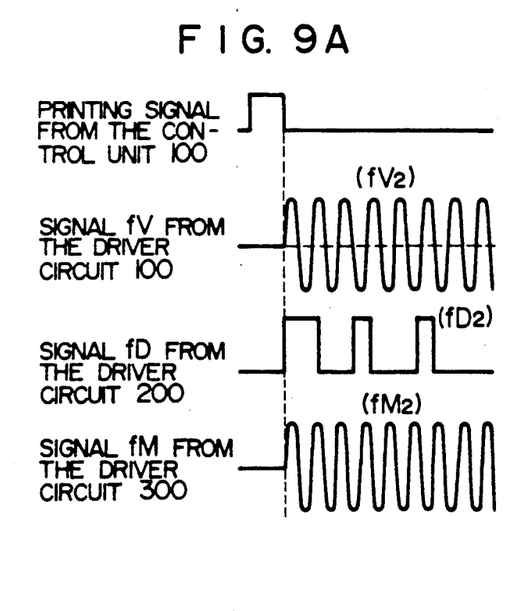
FIGS. 9A and 9B show signals to be generated from the main block by FIG. 1 when the compressed pattern and the expanded pattern in FIGS. 8A and 8B are formed.
Figure 9B:
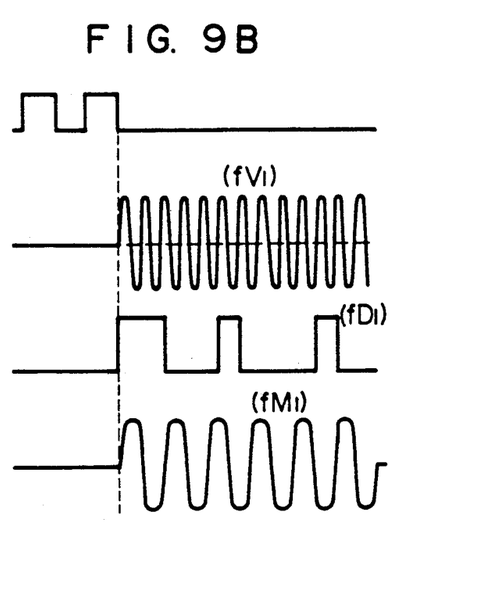

By using the signals shown in FIG. 9, it becomes possible to accurately perform compression and expansion printing of characters and shapes through conversion of dot densities.

Figure 10:
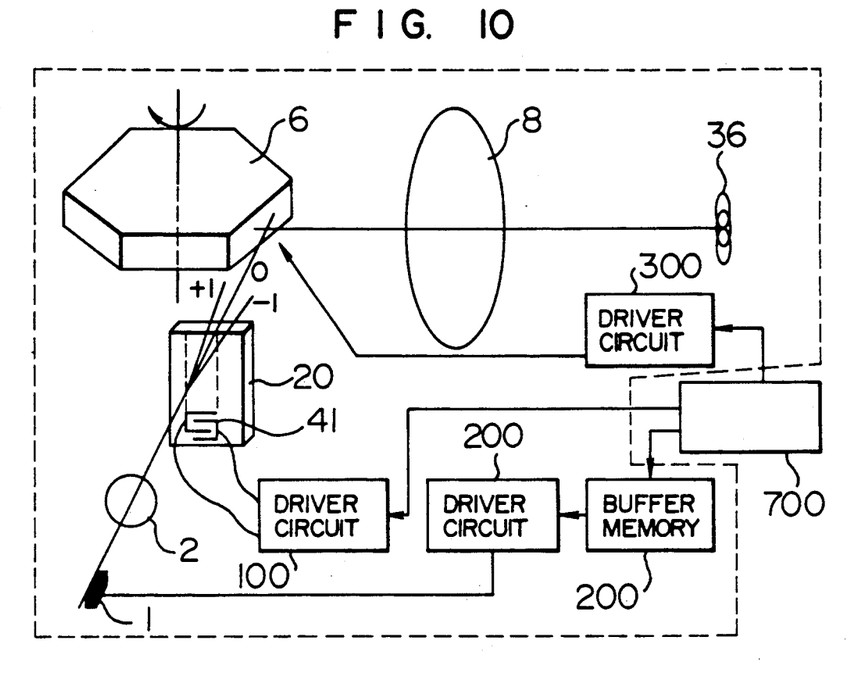
FIG. 10, shows a configuration of a second embodiment of the present invention which includes a dynamic diffraction grating using a surface acoustic wave.

A second embodiment of the present invention will be explained below. FIG. 10 shows a case where a surface acoustic wave element is used as a dynamic diffraction grating. For example, an Al electrode 41 is provided on the surface of a crystal 20 made of $LiNbO_3$, to generate a surface acoustic wave. The electrode 41 has a comb shape, and the interval between the comb teeth is equal to the center oscillation wave length. When a surface acoustic wave is generated, a crystal is distorted to change the bending factor, thereby to play the role of a dynamic diffraction grating.

Operation of the other portions is the same as that for the first embodiment shown in FIG. 1, and their explanation is omitted.

The advantage of using a surface acoustic wave is that compactness and energy saving can be expected. Since a surface acoustic wave is generated only in the depth of 1 $\mu$m to 2 $\mu$m from the surface of the crystal 20, two to three digits of energy saving is achieved in comparison with the case where an ultrasonic wave is generated in a bulk crystal.

Figure 11:
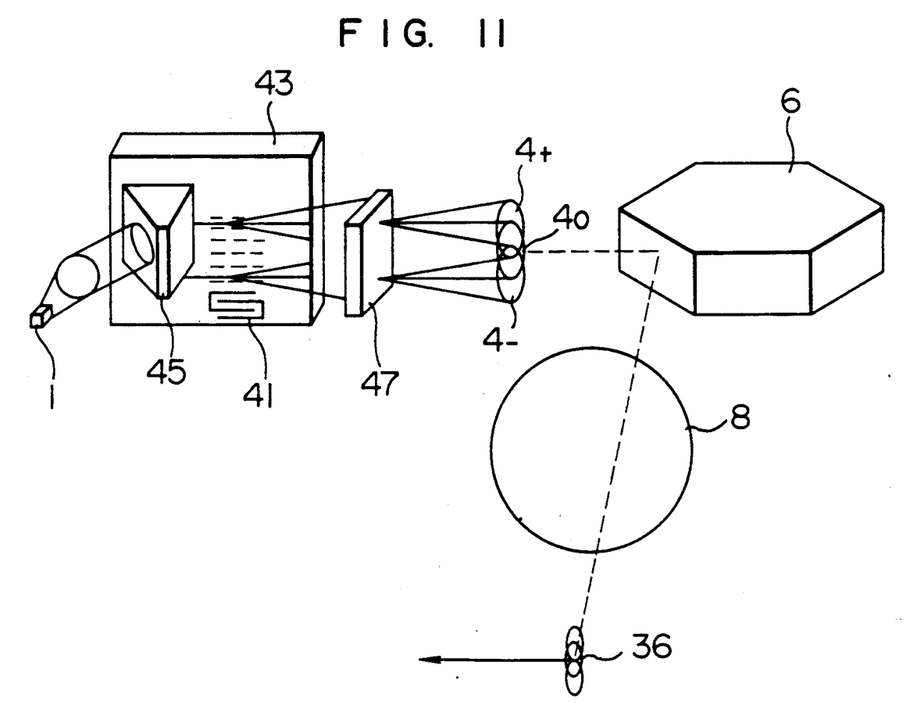
FIG. 11 shows a configuration of a third embodiment which includes a dynamic diffraction grating using a surface acoustic wave.

FIG. 11 shows a third embodiment of the present invention which uses a surface acoustic wave. A laser beam sent from a laser 1 is led to a wave guide path 43 of a $LiNbO_3$ crystal to which Ti is heat diffused, through a prism coupler 45. The wave guide path 43, having a thickness of about 1 $\mu$m, comprises a $LiNbO_3$ crystal on the surface of which Ti is diffused. An electrode 41 which generates an ultrasonic wave is provided in this wave guide path. An ultrasonic wave is generated to be used as a dynamic diffraction grating.

When a laser beam is vertically applied to this dynamic diffraction grating, $\pm$ first order beams 4+ and 4− are generated in the above-described principle. The beams are taken out together with the 0-th beam $4_o$ from the end surface of the wave guide path 43, and are passed to a cylinder lens 43. After shaping the beams, the beams are guided to the polygonal mirror 6. After this, the spot diameter is changed on the drum in the same manner as described with reference to the above-described embodiments.

Next, a fourth embodiment of the present invention will be explained. This embodiment is particularly effective when a plurality of laser beams are scanned in parallel. U.S. Ser. No. 07/390,400 which was applied by the inventors of the present invention on Aug. 7, 1989 has shown that printing density can be converted even in the case of scanning a plurality of laser beams in parallel, by automatically changing over an interval of a plurality of scanning laser beams in the sub scanning direction in accordance with the switching of the printing density. However, in order to perform a more refined recording, it is necessary to change the spot diameter of each scanning beam in the sub scanning direction.

The embodiment in FIG. 4 shows, by taking the case of parallel scanning of two laser beams as an example, that the present invention is also effective for parallel scanning using a plurality of laser beams.

Figure 12:
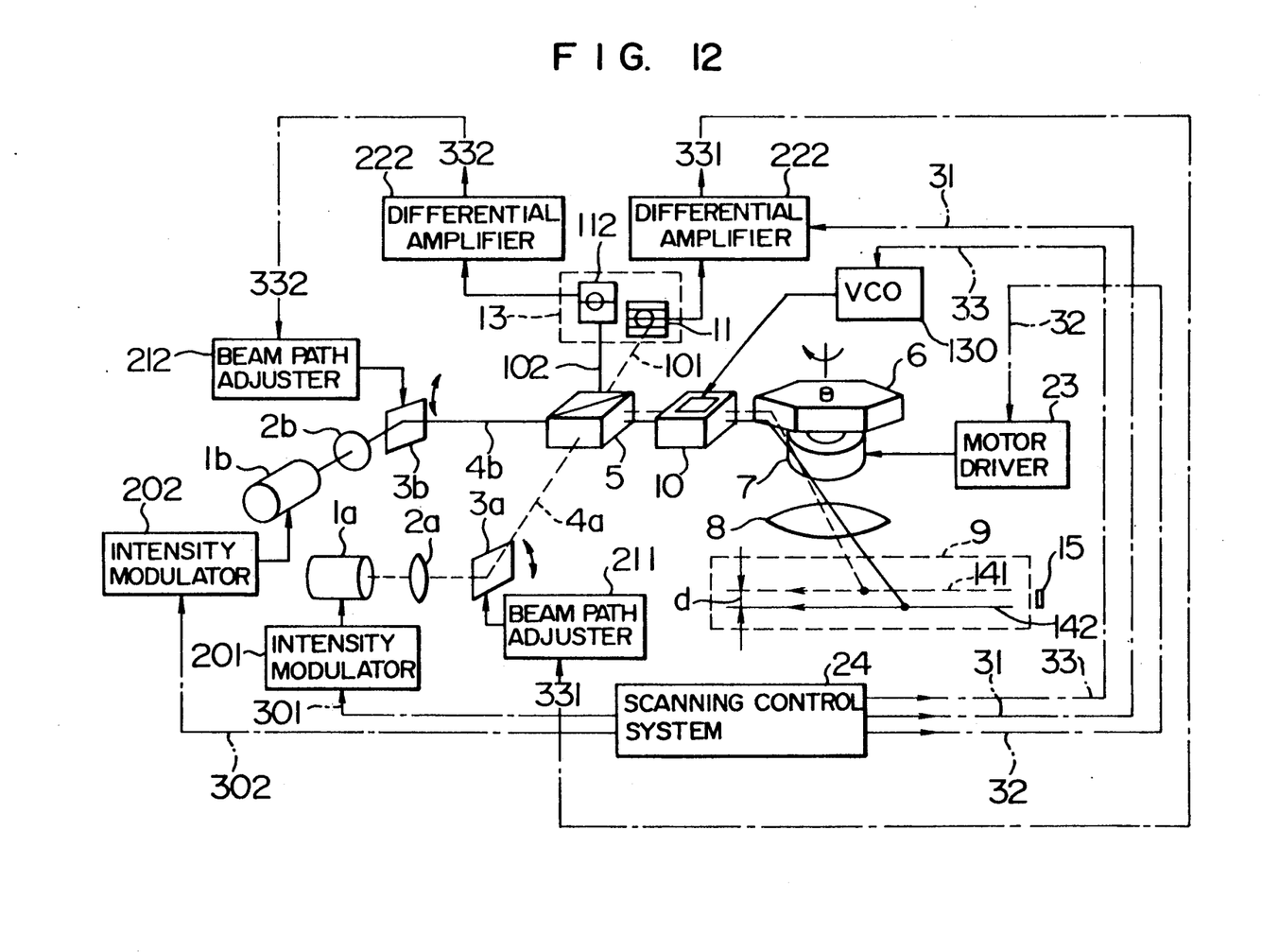
FIG. 12 shows a configuration of a fourth embodiment in which the present invention is applied to a laser printer for parallel scanning of a plurality of beams.

FIG. 12 shows a fourth embodiment of the present invention. Two light sources la and lb emitting linearly polarized light beams are used with the polarization direction of each light beam virtually put in orthogonal arrangement with each other (P and S polarization). Beams 4a and 4b emitted from the light sources are led into a polarizing beam splitter 5 through lenses 2a, 2b and mirrors 3a, 3b provided with beam path adjusters 211, 212 (which adjust the optical paths, for example, through such mechanism as rotary drive members attached to the mirrors 3a, 3b driven by outputs 331, 332 of differential amplifiers 221, 222). The beam splitter 5 performs a function of allowing the P-polarized light to go straight on and to deflect the S-polarized light through a right angle, and hence, the beams 4a and 4b, after passing through the beam splitter 5, advances virtually in the same direction. Then, they are deflected by a rotating polygonal mirror 6 as their deflecting means and passed through a scanning lens 8 so as to make parallel beam scanning on a scanned plane 9 as scanning lines 141 and 142.

The scanning beam detector 15 is for indicating the scan starting position for each beam scanning. Though not shown, output from this detector 15 is used as a sync. signal at the time when data for recording (printing) are delivered.

Figure 13:
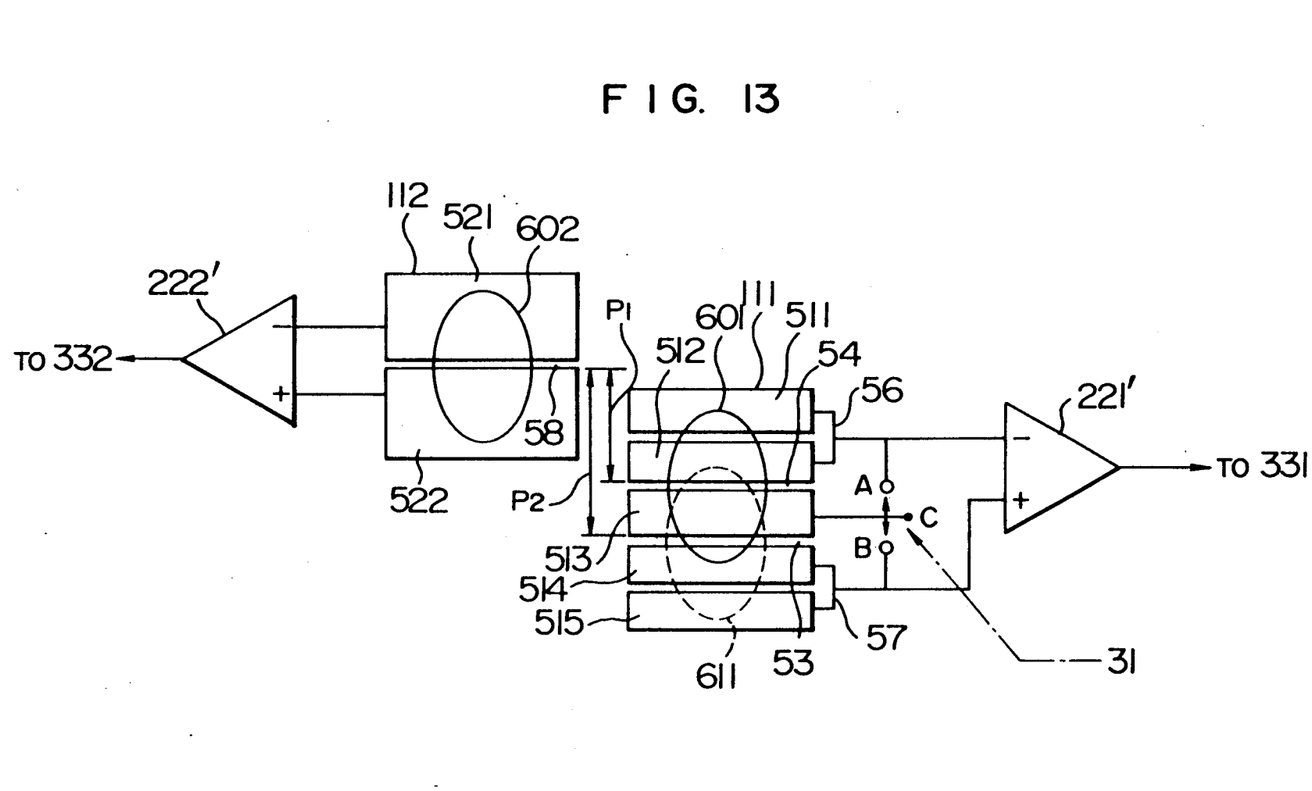
FIG. 13 shows a detailed structure of a light detecting unit which detects an interval of positions of beams used in the embodiment shown in FIG. 12.

Here, the spacing d between the scanning lines 141 and 142 must be maintained at a suitable value corresponding to a prescribed pixel density. To achieve this, portions of incident beams 4a and 4b on the beam splitter 5 are taken out of it as beams for control 101 and 102 and introduced into beam position detectors 111 and 112. The detectors, as shown in FIG. 13, are of the arrangement basically divided into two sections in the direction perpendicular to the scanning directions, and adapted such that illumination power on both sides of the boundary of the divisional area are photoelectrically converted and taken out as electrical signals. Then, the signals are supplied to differential amplifiers 221 and 222 so that differential signals are produced to be supplied to beam path adjusters 211 and 212, whereby orientations of the mirrors 3a and 3b are adjusted so that the differential signals may be kept to zero at all times, and thus, the beams for control 101 and 102 can be steadily kept in positions of the respective boundary of divisional area of the detectors 111 and 112 in the center.

Now, suppose, in the detector 111 shown in FIG. 13, that a terminal C of a lead wire is held separate from both of a terminal A and a terminal B, and the output 331 resulting from the spot 601 of the position control beam 101 is kept to zero, while, in the detector 112, that the output 332 resulting from the spot 602 is kept to zero. In that event, since the detectors 111 and 112 are put in such relative positions as to bring the spacing d between the scanning beams on the scanned plane 9 into being as shown in FIG. 12, the beams for control 101 and 102 are held stabilized and the spacing d between the scanning beams at this time can be kept constant.

Figure 14:
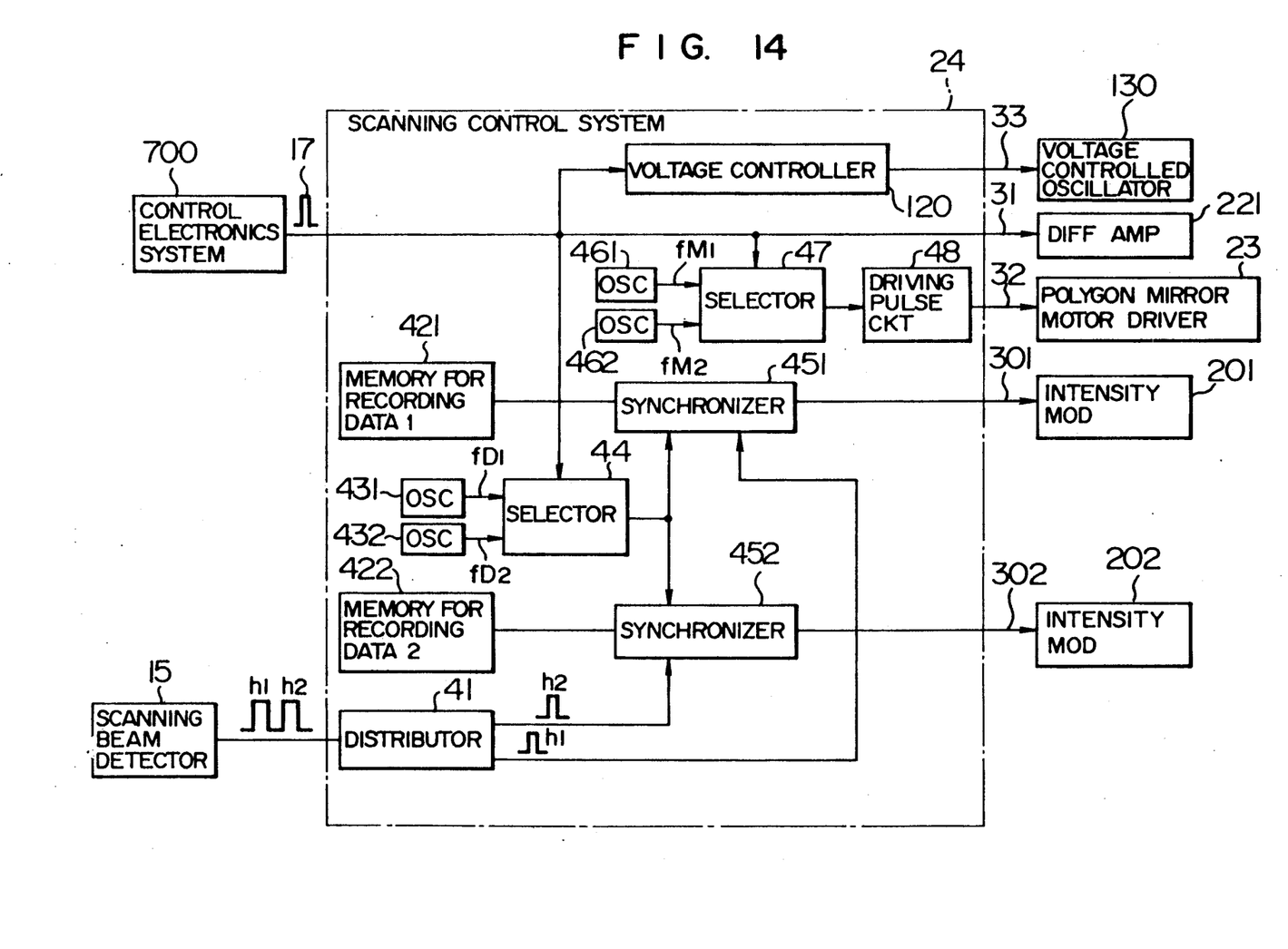
FIG. 14 shows a detailed structure of a scanning control unit which operates the embodiment of FIG. 12.

FIG. 14 is a diagram showing structure of scanning control system 24 (which is also shown in FIG. 12) for driving the above described scanning optical system. Operation for changing pixel density is started by a dot density transfer command 17 from a control electronics system 700.

Now, when a moving speed of the scanned plane 9 (i.e., the rotational speed of photo-sensitive drum) is keep constant, operations for changing pixel density both in the beam scanning direction and in the direction (sub scanning direction) perpendicular thereto will be considered in the following.

First, in the scanning direction, the change in pixel density is achieved by adjusting the pulse width for beam intensity modulation on the pixel signal thereby changing the exposed area. Signals 301 and 302 therefor are delivered from the scanning control system 24 to the intensity modulators 201 and 202. At this time, either of oscillation frequencies $fD_1$ and $fD_2$ from oscillators 431 and 432 is selected by a selector 44 in response to the dot density transfer command 17. Then, data for printing (recording) 301, 302 from memories of recording data 421 and 422 are delivered, at the selected frequencies, to their respective intensity modulators 201 and 202, whereby the laser beams are turned on/off at prescribed rates.

In order to change the pixel density in the direction (sub scanning direction) perpendicular to the scanning direction, the number of revolutions of the rotating polygonal mirror 6 for deflecting the beams of light must be changed.

To achieve this, either of frequencies $fM_1$ and $fM_2$ for driving the rotating polygonal mirror is selected by selector 47 within the scanning control system 24 in response to the dot density transfer command 17, and this selected frequency is passed through a driving pulse circuit 48. Therein, a clock pulse for controlling the rotating speed is generated to operate a polygonal mirror motor driver 23 so that a suitable rotating speed is obtained to attain a prescribed number of scans.

When a plurality of beams, two beams 141 and 142 in FIG. 1, for example, perform scanning at the same time, the spacing d between the plural scanning beams must be changed by the amount (which is preset) corresponding to the change in the pixel density. This is achieved by moving the boundary of divisional area (between 53 and 54, shown in FIG. 13, to be described later) of one detector 111 of those for detecting beam position in accordance with the spacing between the scanning beams.

The above mentioned operation is also performed through the scanning control system 24 in response to the dot density transfer command 17. A detector system to perform the operation is shown in FIG. 13. Illustrated is the case where the spacing d between beams is varied in two ways.

The detector 111 is for the beam 101 and detects the position of its spot 601. The detector 111 is constructed of, for example, five divisions of photo-detecting elements 511 to 515. Of these elements, 511 and 512 as well as 514 and 515 are respectively electrically coupled through lead wires 56 and 57, which in turn are coupled with a differential amplifier 221'. Meanwhile, the terminal C of a lead wire of the photodetecting element 513 is adapted to be selectively connected to either A or B according to a signal 31 from the scanning control system 24. When C is connected with A, the detector 111 functions as a divided-in-two detector with the boundary of divisional area 53 serving as the dividing line. By servo control corresponding to the differential signal provided at this time, the beam spot comes to a stabilized state when it is positioned as shown by dotted line 611 on the detector 111 in FIG. 2. Meanwhile, as to the detector 112 being formed of divided-in-two-photodetecting elements 521 and 522, the beam spot 602 is stabilized thereon when it has the boundary of divisional area 58 in its center. At this time, the distance between the boundary of divisional area 53 and 58 of the two detectors is $P_2$, and corresponding to this value, the spacing d between the scanning beams 141 and 142 on the scanned plane is determined. Then, when C is connected with B in response to the signal 31 from the scanning control system 24, the detector 111 functions as divided-in-two detector having the boundary of divisional area 54 as the dividing line. The beam spot is now stabilized at the position 601 by the servo control dependent on the differential signal at this time. Then, the distance between the two beam spots becomes Pl, and corresponding to which, the beam spacing d on the scanned plane can take another value.

As described above, it is possible to change dot density by changing the interval between the scanning lines even in the scanning optical system which uses a plurality of beams. However, in order to perform printing of higher picture quality, it is necessary to change the laser spot diameter in the sub scanning direction by a suitable value as well as to adjust the interval of the scanning lines. As shown in FIG. 12, the dynamic diffraction grating 10 is inserted between the polarization prism 5 and the polygonal mirror 6. The dynamic diffraction grating 10 is equipped with a transistor 11 for generating an ultrasonic wave, as shown in FIG. 3A. When a compressed pattern is to be printed, for example, the spot diameters of the two scanning laser beams 141 and 142 and the inter-scanning line interval d are set to have almost a suitable relation to perform the printing. In this case, the dynamic diffraction grating 10 is not operated and only the 0-th beam is used without generating the ± first order beams. When an expanded pattern is to be printed, the spot diameters in the sub scanning direction are expanded respectively in relation to the expansion of the interval d. In this case, an ultrasonic wave is generated by applying a suitable high frequency to the dynamic diffraction grating 10 and the spot diameters of the laser beams 4a and 4b from the polarization prism 5 can be expanded respectively, as described above with reference to FIG. 3A. A suitable relationship can be maintained between the interval d between the scanning lines 141 and 142 and the values of the respective spot diameters, to perform printing of high picture quality.

Control of the above operation will be described below with reference to FIG. 14. A voltage control circuit 120 is operated based on the dot density change instruction 17 to generate a voltage which causes a VCO (voltage controlled oscillator) circuit 130 to generate a suitable high frequency. The VCO circuit 130 generates a high frequency in accordance with the voltage applied to it, and operates the dynamic diffraction grating 10. In the present embodiment, the dynamic diffraction grating 10 is not operated to print a compressed pattern, and a suitable high frequency is applied in synchronism with the drive frequency fM of the polygonal mirror 6, the laser modulation frequency fD and the changing of the division line of the light detector 111 only when an expanded pattern is to be printed. Thus, the spot diameter of each scanning laser beam in sub scanning direction is changed.

As described above, when a plurality of beams are to be scanned, it is always possible to maintain optimum values for an interval between adjacent scanning beams and for a spot diameter in order to change the picture element density or the printing dot density.

FIGS. 15A to I are time charts for operating the scanning optical system shown in FIG. 12.

Figure 15A:
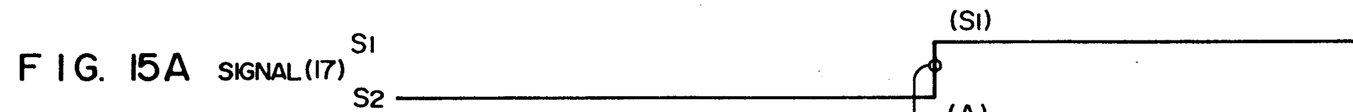
FIG. 15 is a time chart which shows the operation of the embodiment shown in FIG. 12.
Figure 15B:
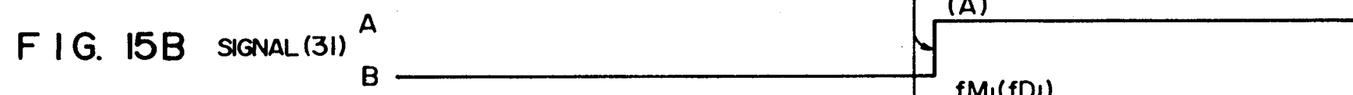
Figure 15C:
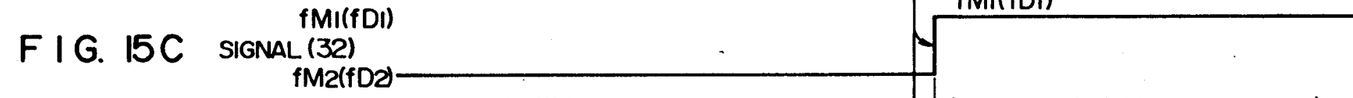
Figure 15D:
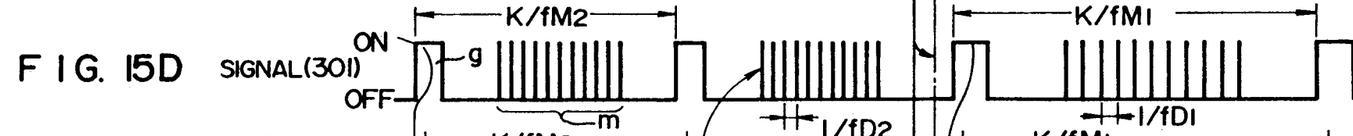
Figures 15E, 15F, 15G:
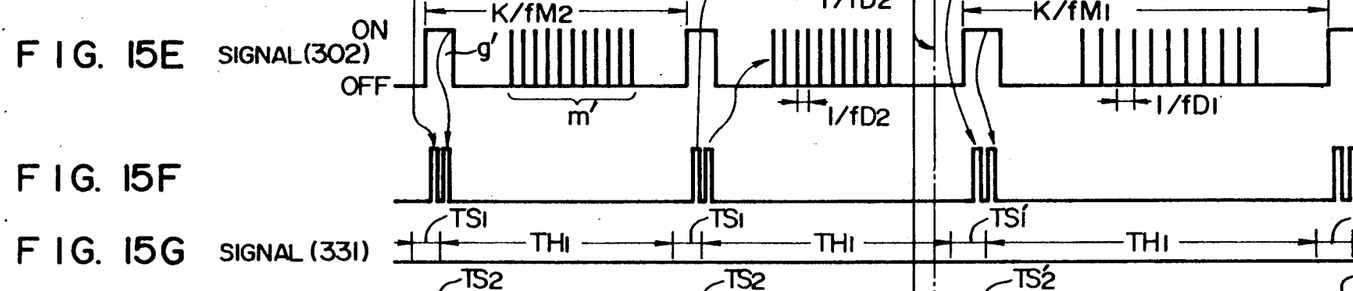
Figures 15H, 15I:
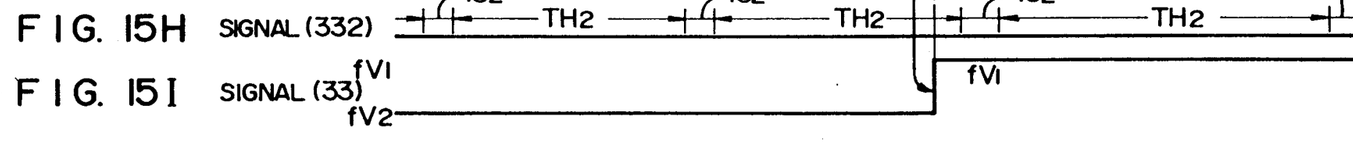

FIG. 15A shows states of two kinds of pixel densities (including dot density) $S_1$ and $S_2$ of which either one is selected. FIG. 15B shows the state of connection of the photodetecting element 513 of the detector 111 for controlling the beam position in FIG. 13, which occurs in succession to the state of the FIG. 15A (corresponding to the signal 31). FIG. 15C shows the state of the driving frequency $fM_1$ or $fM_2$ of the rotating polygonal mirror 6, which occurs following the state of FIG. 15A (corresponding to signal 32). Also, the laser modulating frequency $fD_1$ and $fD_2$ is similarly selected. FIGS. 15D and 15E show laser modulating signals (corresponding to signals 301 and 302). Of the same, the portion denoted by m, m' shows signal waveforms of the pattern to be recorded (printed) and the modulating frequency is $fD_1$ or $fD_2$. The scanning period K/fM is determined in a fixed proportion to the number of revolutions of the rotating polygonal mirror and K is the constant for that proportion. The portion denoted by g, g' is that where a laser is turned on (lighted) for detecting the beam position for each scanning. FIG. 15F shows the signal output waveform from the scanning beam detector 15 as a sync. signal for determining the delivery timing of the dot signal representing the recording (printing) pattern. FIGS. 15G and 15H show sampling and holding times (corresponding to signals 331 and 332) of the sampled-data control system used for stabilizing the scanning beam spacing, in which $TS_1$ and $TS_2$ indicate sampling periods and $TH_1$ and $TH_2$ indicate holding periods. While the laser is turned on in the vicinity of the scanning starting position (TS, corresponding to g, g' in FIG. 15D, 15E), detection and control of the scanning beam spacing is performed, and this state is maintained during the period following it (TH), and these operations are repeated for each scanning.

FIG. 15I shows the state of a high frequency signal fV to be applied to the dynamic diffraction grating 10. Since $S_2$ shows the state of a compressed pattern, the dynamic diffraction grating 10 is not operated in the present embodiment. Since the state of $S_1$ corresponds to an expanded pattern, a suitable high frequency signal $fV_1$ is applied to the dynamic diffraction grating 10, to generate ± first order beams. It is also good to apply the high frequency signals $fV_1$ and $fV_2$ which have different frequencies, in accordance with the state of $S_1$ and $S_2$, to always operate the dynamic diffraction grating 10.

By operating the dynamic diffraction based on the time charts as described above, it is possible to change the spot diameter in the sub scanning direction following the change of the dot density even in the case of parallel scanning using a plurality of beams.

As a concrete example of the beam path adjuster 211, 212, as shown in the embodiment of FIG. 12, one employing electromagnetic drive represented by a galvano mirror or a piezoelectric element for minute adjustment of the mirror or the like being widely known may be used.

Although the case where two beams are used for parallelly scanning was described above, the present embodiment is applicable to beam parallel scanning using more than two beams.

The present embodiment, as described so far, is provided with means to change the scanning beam spacing to prescribed values and to change a spot diameter of each scanning beam in performing multi-beam parallel scanning with the use of a plurality of light sources, and therefore, it can change pixel density or printing dot density using the same arrangement to thereby product much higher quality images at all times for image formation. Besides, these operations can be achieved without requiring troublesome adjustments such as mechanical adjustment but can be achieved through electrical adjustment. Since the adjustments can be performed relatively easily requiring no sophisticated adjustments, a great effect is obtained that a high-performance and easily operable light beam scanning apparatus can be provided.

As described above, a dynamic diffraction grating of which diffraction grating interval can be freely changed is inserted into the laser scanning optical system and its diffraction beam is utilized. By this arrangement, an optimum focused laser spot size can be obtained each time by effectively utilizing the light quantity without substantially losing it even if the scanning density has changed, so that more satisfactory picture quality can be obtained.

It is needless to mention that the object of the present invention can be achieved by placing the dynamic diffraction grating in the common light path even in the case of multi-spot scanning where a plurality of light sources are used as shown in FIG. 12.

While a preferred embodiment has been set forth along with modifications and variations to show specific advantageous details of the present invention, further embodiments, modifications and variations are contemplated within the broader aspects of the present invention, all as set forth by the spirit and scope of the following claims.

I claim:

1. A variable density scanning apparatus comprising:
   laser beam generating means for generating at least one laser beam;
   first drive means for applying to said laser beam generating means a modulation drive signal having a fist modulation frequency when the density of dots which constitutes a pattern to be formed on the scanning surface is to be made high, and a modulation drive signal having a second modulation frequency which is lower than said first modulation frequency when the dot density is to be made low;

diffraction means responsive to a laser beam from said laser beam generation means for diffracting said laser beam into at least 0-th and first order diffraction beams;

second drive means for applying to said diffraction means a diffraction drive signal having a first high frequency when the dot density is to be made high, and a diffraction drive signal having a second high frequency which is higher than said first high frequency when the dot density is to be made low;

rotary drive means responsive to a diffraction beam from said diffraction means for scanning said diffraction beam in the main scanning direction; and third drive means for applying to said rotary drive means a rotary drive signal having a first rotation frequency when the dot density is to be made high, and a rotary drive signal having a second rotation frequency lower than said first rotation frequency when the dot density is to be made low.

2. The variable density scanning apparatus according to claim 1, wherein said rotary drive means includes an optical element rotating to scan the diffraction beams in the main scanning direction and rotates said optical element at a speed dependent upon the frequency of the rotary drive signal so that the speed is changed by a ratio depending upon the ratio of the printing densities as determined by the change in rotary drive signals.

3. The variable density scanning apparatus according to claim 1, wherein said laser beam generating means modulates said laser beam at a laser frequency dependent upon the frequency of the modulation drive signal so that the laser frequency is changed by a ratio depending upon the ratio of the printing densities as determined by the change in modulation drive signals.

4. The variable density scanning apparatus according to claim 1, further including means for changing dot density in the main scanning direction by changing the pulse width of the modulation drive signal to correspondingly change the dot diameter in the main scanning direction.

5. The variable density scanning apparatus according to claim 1, wherein said diffraction means diffracts said laser beam into said diffraction beams in a sub-scanning direction perpendicular to the main scanning direction in response to the frequency of the diffraction drive signal to correspondingly change the dot diameter in the sub-scanning direction.

6. The variable density scanning apparatus according to claim 5, wherein said diffraction means includes a crystal and means responsive to the diffraction drive signal for producing an ultrasonic wave through said crystal for diffracting the laser beam.

7. The variable density scanning apparatus according to claim 5, wherein said diffraction means includes a crystal and means for producing a surface acoustic wave in response to the diffraction drive signal for diffracting the laser beam.

8. The variable density scanning apparatus according to claim 5, wherein said diffraction means continuously changes the diameter of the dots in the sub-scanning direction in response to a continuous change of frequency of the diffraction drive signal.

9. A variable density scanning apparatus comprising:
a laser beam generating means for generating at least one laser beam;

first drive means for applying to said laser beam generating means a modulation drive signal having a first modulation frequency when the density of dots which constitute a pattern to be formed on the scanning surface is to be made high, and a modulation drive signal having a second modulation frequency lower than said first modulation frequency when the dot density is to be made low;

diffraction means responsive to a laser beam from said laser beam generating means for diffracting said laser beam into at least 0-th and first order diffraction beams;

second drive means for applying to said diffraction means a diffraction drive signal having a first high frequency when the dot density is to be made high, and a diffraction drive signal having a second high frequency higher than said first high frequency when the dot density is to be made low;

rotation scanning means responsive to a diffraction beam from said diffraction means for scanning said diffraction beam in the main scanning direction;

third drive means for applying to said rotary scanning means a rotation drive signal having a first rotation frequency when the dot density is to be made high, and a rotation drive signal having a second rotation frequency lower than said first rotation frequency when the dot density is to be made low; and control means for applying to said first, second and third drive means respectively a control signal indicative of an instruction for making the dot density to be either high or low.

10. A variable density scanning apparatus comprising:
a semiconductor laser for generating at least one laser beam;

a first drive circuit for applying to said semiconductor laser a modulation drive signal having a first modulation frequency when the density of dots which constitute a pattern to be formed on the scanning surface is to be made high, and a modulation drive signal having a second modulation frequency lower than said first modulation frequency when the dot density is to be made low;

a dynamic diffraction grating responsive to a laser beam from said semiconductor laser for diffracting said laser beam into at least 0-th and first order diffraction beams;

a second drive circuit for applying to said dynamic diffraction grating a diffraction drive signal having a first high frequency when the dot density is to be made high, and a diffraction drive signal having a second high frequency higher than said first high frequency when the dot density is to be made low;

a polygonal mirror responsive to at least first and second diffraction beams from said dynamic diffraction grid for scanning said diffraction beams in the main scanning direction;

a third drive circuit for applying to said polygonal mirror a rotation drive signal having a first rotation frequency when the dot density is to be made high, and a rotation drive signal having a second rotation frequency lower than said first rotation frequency when the dot density is to be made low; and a control unit for applying to said first, second and third drive circuits respectively a control signal indicative of an instruction for making the dot density to be either high or low.

11. The variable density scanning apparatus according to claim 10, wherein said polygonal mirror is rotatably mounted to scan the diffraction beams in the main scanning direction and rotates at a speed dependent upon the frequency of the rotary drive signal so that the speed is changed by a ratio depending upon the ratio of the printing densities as determined by the change in rotary drive signals.

12. The variable density scanning apparatus according to claim 10, wherein said semiconductor laser modulates said laser beam at a laser frequency dependent upon the frequency of the modulation drive signal so that the laser frequency is changed by a ratio depending upon the ratio of the printing densities as determined by the change in modulation drive signals.

13. The variable density scanning apparatus according to claim 10, further including means for changing dot density in the main scanning direction by changing the pulse width of the modulation drive signal to correspondingly change the dot diameter in the main scanning direction.

14. The variable density scanning apparatus according to claim 10, wherein said dynamic diffraction grating diffracts said laser beam into said diffraction beams in a sub-scanning direction perpendicular to the main scanning direction in response to the frequency of the diffraction drive signal to correspondingly change the dot diameter in the sub-scanning direction.

15. The variable density scanning apparatus according to claim 14, wherein said dynamic diffraction grating includes a crystal and means responsive to the diffraction drive signal for producing an ultrasonic wave through said crystal for diffracting the laser.

16. The variable density scanning apparatus according to claim 14, wherein said dynamic diffraction grating includes a crystal and means for producing a surface acoustic wave in response to the diffraction drive signal for diffracting the laser beam.

17. The variable density scanning apparatus according to claim 14, wherein said dynamic diffraction grating continuously changes the diameter of the dots in the sub-scanning direction in response to a continuous change of frequency of the diffraction drive signal.

* * * * *